(12) United States Patent
Altherr et al.

(10) Patent No.: US 12,609,580 B2
(45) Date of Patent: Apr. 21, 2026

(54) ROTOR SHAFT AND ROTOR FOR ROTOR POSITION SENSING

(71) Applicant: MAHLE International GmbH, Stuttgart (DE)

(72) Inventors: Patrick Altherr, Stuttgart (DE); Marius Ebli, Eichstaett (DE); Mario Mohler, Rosengarten (DE)

(73) Assignee: MAHLE International GmbH, Stuttgart (DE)

( * ) Notice: Subject to any disclaimer, the term of this patent is extended or adjusted under 35 U.S.C. 154(b) by 275 days.

(21) Appl. No.: 18/081,622

(22) Filed: Dec. 14, 2022

(65) Prior Publication Data

US 2023/0188003 A1     Jun. 15, 2023

(30) Foreign Application Priority Data

Dec. 15, 2021     (DE) ..................... 10 2021 214 471.3

(51) Int. Cl.
| | |
|---|---|
| *H02K 7/00* | (2006.01) |
| *H02K 7/08* | (2006.01) |
| *H02K 11/215* | (2016.01) |

(52) U.S. Cl.
CPC .............. *H02K 7/003* (2013.01); *H02K 7/08* (2013.01); *H02K 11/215* (2016.01)

(58) Field of Classification Search
None
See application file for complete search history.

(56) References Cited

U.S. PATENT DOCUMENTS

| | | | |
|---|---|---|---|
| 4,274,053 A | 6/1981 | Ito et al. | |
| 4,599,561 A | 7/1986 | Takahashi et al. | |
| 6,714,005 B2 | 3/2004 | Kimura et al. | |
| 10,704,926 B2 * | 7/2020 | Aichriedler ............ | G01D 5/145 |
| 11,353,339 B2 | 6/2022 | Slama | |
| 2002/0135497 A1 * | 9/2002 | Kimura .................. | G01D 5/145 |
| | | | 340/870.31 |
| 2016/0061637 A1 | 3/2016 | Aichriedler et al. | |
| 2020/0076341 A1 * | 3/2020 | Mclean .................... | H02K 9/19 |
| 2021/0281134 A1 * | 9/2021 | Lux ........................ | H02K 21/14 |

FOREIGN PATENT DOCUMENTS

| | | | | |
|---|---|---|---|---|
| DE | 2908599 A1 | 9/1979 | | |
| DE | 10212859 A1 | 10/2002 | | |
| DE | 102007004647 A1 | 7/2008 | | |
| DE | 102019122046 A1 | 2/2021 | | |
| EP | 3293495 A1 | 3/2018 | | |
| WO | WO-2015132021 A1 * | 9/2015 | ............ | H02K 11/21 |
| WO | 2020216095 A1 | 10/2020 | | |

* cited by examiner

*Primary Examiner* — Bernard Rojas
(74) *Attorney, Agent, or Firm* — Barnes & Thornburg

(57) ABSTRACT

A rotor shaft for a rotor of an electric machine is provided. The rotor shaft includes a hollow shaft extending along an axial direction that is rotatably mounted about an axis of rotation, which delimits a hollow shaft interior that can be flowed through by a coolant. Further, the rotor shaft includes a sensor device arranged in the hollow shaft interior for determining a current rotary position or/and current rotational speed of the hollow shaft.

15 Claims, 1 Drawing Sheet

ROTOR SHAFT AND ROTOR FOR ROTOR POSITION SENSING

CROSS REFERENCE TO RELATED APPLICATIONS

This application claims priority to German patent application 10 2021 214 471.3, filed Dec. 15, 2021, the entire content of which is incorporated herein by reference.

TECHNICAL FIELD

The disclosure relates to a rotor shaft for a rotor and to a rotor having such a rotor shaft. In addition, the disclosure relates to an electric machine having such a rotor.

BACKGROUND

Electric machines are equipped with a rotor having a magnetic field generating means for generating a magnetic rotor field, which can magnetically interact with a magnetic stator field generated by the stator of the machine, by way of which the rotor is driven. For an optimized drive of the rotor, it is important to know the current position and the current rotational speed of the rotor. There exist different sensor systems for this purpose which are typically arranged outside on the rotor shaft of the rotor. However, a rotor shaft having such a sensor system requires relatively much installation space.

SUMMARY

It is an object of the present disclosure to show new ways in the development of rotor shafts for rotors of electric machines. In particular, a rotor shaft is to be created which includes a sensor system for determining its current rotary position or/and its current rotational speed and, despite the presence of this sensor system, requires only little installation space.

The object is achieved by a rotor shaft for a rotor of an electric machine, a rotor for an electric machine, and an electric machine as described herein.

Accordingly, a basic idea of the disclosure is to arrange a sensor device for determining a current rotary position or a current rotational speed within a hollow shaft forming the rotor shaft, i.e., in a hollow shaft interior delimited by the hollow shaft. Thus, no installation space whatsoever is needed for the sensor device outside the hollow shaft any longer, i.e., outside on the rotor shaft, so that this installation space is available for other purposes. A further advantage of the idea of arranging the said sensor device within the rotor shaft that is substantial for the disclosure consists in that the sensor device with its sensor components—that are sensitive in particular to mechanical shocks and the like—are particularly well protected against such external interference influences.

In detail, the rotor shaft according to the disclosure includes a hollow shaft which extends along an axial direction and is rotatably mounted about an axis of rotation. The hollow shaft surrounds a hollow shaft interior that can be preferentially flowed through by a coolant. According to the disclosure, the rotor shaft comprises a sensor device arranged in the hollow shaft interior for determining a current rotary position or/and a current rotational speed of the hollow shaft.

According to an exemplary embodiment, the hollow shaft is formed open at least at a first axial end. The second axial end located opposite the first axial end can also be formed open, but also closed. Further, the rotor shaft includes a longitudinal fastening element formed preferentially rod or bolt-like, which extends through the first axial end into the hollow shaft interior. The fastening element can be formed fixed in place relative to a housing of an electric machine, which includes the rotor shaft as part of a rotor of the machine and on which the rotor shaft can be rotatably mounted. For this purpose, the fastening element can be firmly connected to the housing. Alternatively or additionally, it is also conceivable that the fastening element is arranged fixed in place relative to a stator of the electric machine and for this purpose is firmly connected to the said stator.

In all variants of this exemplary embodiment, the sensor device is partially arranged on the fastening element and partially on the hollow shaft that is rotatable relative to the fastening element, so that upon rotation of the rotor shaft relative to the fastening element, the part of the sensor device arranged on the hollow shaft rotates relative to the part of the sensor device arranged on the fastening element. This movement can be detected by the sensor device.

According to an advantageous further development, the fastening element is formed as a cooling lance that can be flowed through by the coolant, which cooling lance communicates fluidically with the hollow shaft interior, so that coolant flowing through the cooling lance can be introduced into the hollow shaft interior. In this way, a cooling function is integrated in the hollow shaft with which the rotor coils arranged on the rotor shaft and generating heat when electrically energized, can be cooled.

Typically, the sensor device can include at least one position/speed encoder and a position/speed sensor interacting with the at least one position/speed encoder for determining a relative rotary position or/and relatively rotational speed between the position/speed encoder and the position/speed sensor. The position/speed encoder generates a position or speed signal that is measurable by the position/speed sensor. In this variant, the position/speed encoder is firmly connected to the hollow shaft and the position/speed sensor is firmly connected to the fastening element, in particular the cooling lance. This makes possible a particularly precise determination of the current rotary position or current rotational speed of the rotor shaft. When the sensor device is a magnetic sensor device, the position/speed encoder can be a magnetic encoder and the position/speed sensor a magnetoresistive sensor. The magnetic encoder can be formed by a pole ring made of a magnetic material. The use of Hall sensors is also conceivable.

According to a further advantageous further development, the position/speed encoder is arranged on an inner circumferential side of the hollow shaft facing the fastening element. In this exemplary embodiment, the position/speed sensor is arranged on an outer circumferential side of the fastening element or the cooling lance facing the hollow shaft. Practically, the position/speed encoders and the position/speed sensors lie opposite one another in the radial direction, i.e., are arranged at the same axial height. Because of this, an interaction between the position/speed encoder and the position/speed sensor that is particularly low in interference or even free of interference is possible, as a result of which in turn a particularly high measuring accuracy can be achieved in determining the rotary position or rotational speed. Apart from this, only little installation space—in particular axially—is required for the entire sensor device.

According to another exemplary embodiment, the hollow shaft includes a shaft body of hollow-cylindrical geometric shape which at a first axial end merges into an extension with a diameter reduced relative to the shaft body. The extension can be an output element or an output plug of the rotor shaft, which axially closes off in particular the hollow shaft. However, the extension can also be a bearing element for rotatably mounting the rotor shaft. In particular, the extension can be a bearing plug which axially closes off the hollow shaft. In all variants of the exemplary embodiment, the position/speed encoder of the sensor device is arranged or formed on the extension. Because of this, the position/speed encoder can be particularly easily attached to the hollow shaft during the course of the assembly of the rotor shaft.

Particularly practically, the hollow shaft, in particular the extension, can be rotatably mounted on the fastening element, in particular the cooling lance, with a bearing device. This makes possible mounting the hollow or rotor shaft with particularly little play that is thus precise.

Typically, the position/speed encoder can be formed by at least one surface structure formed on the surface of the hollow shaft, which surface structure comprises a plurality of elevations and recesses alternately following one another along a circumferential direction. Such a surface structure can be quickly realized particularly easily, which is accompanied by cost advantages in the production of the rotor shaft. In addition to this, a position/speed encoder formed in such a manner requires only little installation space and is therefore particularly well suited for being arranged in the hollow shaft interior according to the disclosure. Typically, the surface structure can be introduced into the surface by way of cold extrusion or milling or casting or engraving or laser marking.

According to a further advantageous further development, the position/speed encoder includes at least two surface structures axially offset from one another, which differ from one another in at least one structure characteristic. The said at least one structure characteristic can be a number of elevations provided along the circumferential direction, a geometrical shaping of the elevations or/and recesses and a respective distance from one another of elevations or recesses adjacent along the circumferential direction. Both surface structures combined make possible a highly accurate and simultaneous measurement both of the current rotary position and also of the current rotational speed of the rotor shaft.

Typically, the two surface structures arranged axially offset from one another can be designed and matched to one another so that they produce a phase-shifted quadrature signal upon rotation of the rotor shaft.

According to an advantageous further development, the sensor device includes at least one electrical signal line for the signal transmission of sensor signals generated by the sensor device, in particular the position/speed sensor. Alternatively or additionally, the sensor device in this further development includes at least one electrical supply line for supplying the sensor device, in particular the position/speed sensor, with electric energy. Both the at least one electrical signal line and also the at least one electrical supply line can be routed through the fastening element or the cooling lance out of the hollow shaft interior to the outside in the external surroundings of the rotor shaft. In both variants, taken by themselves or combined, the electrical wiring of the sensor device arranged in the hollow shaft interior proves to be particularly simple and requires only little installation space.

The disclosure also relates to a rotor for an electric machine. The rotor includes a rotor shaft according to the disclosure introduced above, so that the advantages of the rotor shaft according to the disclosure explained above apply also to the rotor according to an exemplary embodiment of the disclosure. Further, the rotor according to an exemplary embodiment of the disclosure includes a rotor shaft according to an exemplary embodiment of the disclosure and multiple, that is at least two magnetic field generating elements non-rotatably connected to the rotor shaft for generating a magnetic rotor field.

According to an exemplary embodiment, the magnetic field generating elements can be rotor permanent magnets or electrically energizable rotor coils. Thus, the rotor according to the disclosure with the rotor shaft according to the disclosure can be employed both into an external excited electric synchronous machine and also in a permanent magnet-excited synchronous machine.

The disclosure therefore relates also to an electric machine having a stator for generating a magnetic stator magnetic field and to a rotor according to the disclosure, which magnetic field generating elements, for driving the rotor shaft, are magnetically coupled to the stator magnetic field. The advantages of the rotor shaft explained above therefore apply also to the electric machine according to the disclosure.

Typically, the machine can be an externally excited electric synchronous machine or a permanent magnet-excited synchronous machine or an asynchronous machine, wherein the stator is an electrically energizable synchronous machine stator for generating a magnetic stator field.

Further important features and advantages of the disclosure are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present disclosure.

Exemplary embodiments of the disclosure are shown in the drawings and are explained in more detail in the following description, wherein same reference numbers relate to same or similar or functionally same components.

BRIEF DESCRIPTION OF THE DRAWINGS

The disclosure will now be described with reference to the drawings wherein.

DESCRIPTION OF EXEMPLARY EMBODIMENTS

Figure 1:
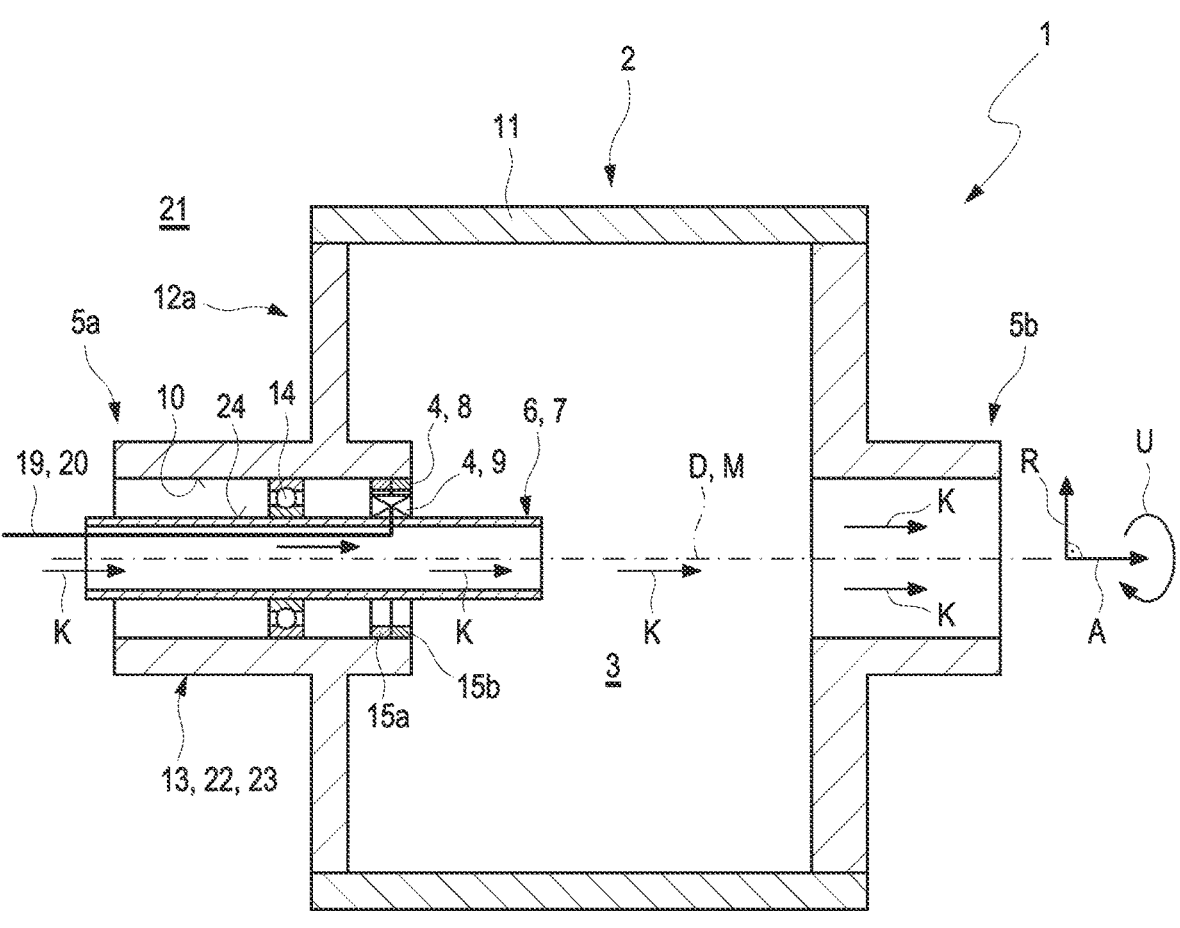
FIG. 1 shows a rotor shaft in a longitudinal section according to an exemplary embodiment of the disclosure.

FIG. 1 shows a rotor shaft according to an exemplary embodiment of the disclosure for a rotor of an electric machine in a longitudinal section. The rotor shaft 1 includes a hollow shaft 2 extending along an axial direction A rotatably mounted about an axis of rotation D. FIG. 1 shows a longitudinal section of the rotor shaft 1 along the axial direction A. The axis of rotation D can be a center longitudinal axis M of the hollow shaft 2.

According to FIG. 1, a radial direction R extends perpendicularly to the axial direction A away from the axis of rotation D or center longitudinal axis M. A circumferential direction U runs perpendicularly to the axial direction A, and also perpendicularly to the radial direction R round about the axis of rotation D or the center longitudinal axis M.

The hollow shaft 2 surrounds a hollow shaft interior 3 that can be flowed through by a coolant K. Further, the rotor shaft 1 includes a sensor device 4 arranged in the hollow shaft interior 3 for determining a current rotary position or/and rotational speed of the hollow shaft 2.

The hollow shaft includes a shaft body 11 with hollow-cylindrical geometrical shape, which at its first axial end 12a merges into an extension 13 with diameter reduced relative to the shaft body 11. The extension 13 can be an output element 23 or an output plug 22 of the rotor shaft 1. As is shown in FIG. 1, the hollow shaft 2 or the extension 13 can be rotatably mounted on the fastening element 6 or the cooling lance 7 with a bearing device 14. There, the bearing device 14 can simultaneously assume the function of a sealing device, with which the hollow shaft interior 3 is sealed against the external surroundings 21 of the rotor shaft 1, so that no coolant K can leak out of the hollow shaft interior 3 into the external surroundings 21.

According to FIG. 1, the hollow shaft 2 is formed open at a first axial end 5e, at which the extension 13 is arranged. The second axial end 5b located opposite the first axial end 5a can be formed open, as shown, but also closed (not shown). In addition, the rotor shaft 1 includes a longitudinal actuation element 6 formed rod-like in the exemplary scenario, which extends through the first axial end 5a into the hollow shaft interior 3.

In the exemplary embodiment shown in FIG. 1, the fastening element 6 is formed as a cooling lance 7 that can be flowed through by the coolant K. This cooling lance 7 communicates fluidically with the hollow shaft interior 3. Thus, coolant K can be introduced through the cooling lance 7 into the hollow shaft interior 3. As shown, the sensor device 4 is partially arranged on the fastening element 6 and partially on the hollow shaft 2 that is rotatable relative to the fastening element 6. In details, the sensor device 4 includes a position/speed encoder 8 and position/speed sensor 9 interacting with the at least one position/speed encoder 8 for determining a relative rotary position and a current relative rotational speed between position/speed encoder 8 and position/speed sensor 9.

As is evident from FIG. 1, the position/speed encoder 8 is firmly connected to the hollow shaft 2. The position/speed sensor 9 is firmly connected to the fastening element 6 or the cooling lance 7. Thus, the current rotary position and the current rotational speed of the rotor shaft 2 relative to the fastening element 6 or the cooling lance 7 can be determined with the position/speed encoder 8 and with the position/speed sensor. In the exemplary scenario, the position/speed encoder 8 is arranged on an inner-circumferential site 10 of the hollow shaft 2 facing the fastening element 6. Opposite this, the position/speed sensor 9 is arranged on an outer-circumferential site 24 of the fastening element 6 or of the cooling lance 7 facing the hollow shaft 2. The position/speed encoder 8 and the position/speed sensor 9 lie radially opposite one another.

Further, the position/speed sensor 8 of the sensor device 4 is arranged and formed on the extension 13, that is on the output element 23 or output plug 22. There, the position/speed sensor 8 is realized by way of two surface structures 15a, 15b formed on the surface of the hollow shaft 2 or of the extension 13 and axially arranged next to one another.

Figure 2:
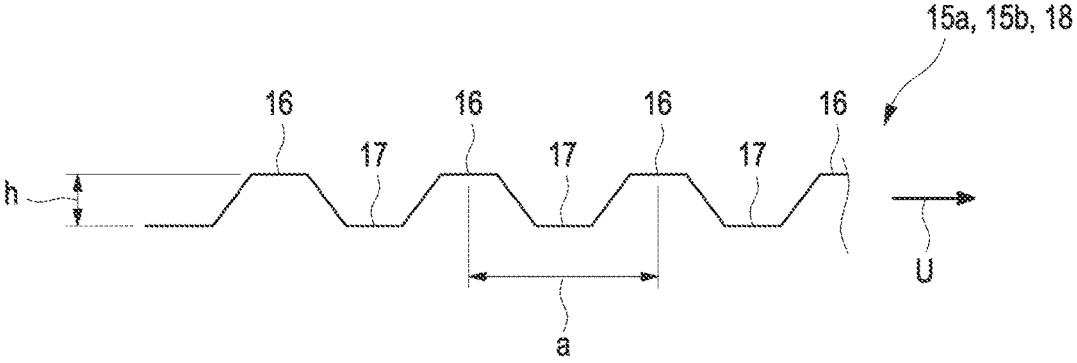
FIG. 2 shows a possible technical configuration of a profiling forming a position encoder according to an exemplary embodiment of the disclosure.

Each of the two surface structures 15a, 15b comprises a plurality of elevations 16 and recesses 17 shown in FIG. 2 which alternately follow one another along the circumferential direction U. There, the elevations 16 and the recesses 17 form a profiling 18. The surface structures 15a, 15b or the profiling 18 can be produced during the course of the production of the hollow shaft 2 with cold extrusion, milling or casting. As shown in FIG. 2, the elevations 16 can have a trapezium-shaped geometry, but a rounded, rectangular or triangular geometry (not shown) is also conceivable. The two surface structures 15a, 15b arranged axially next to one another differ from one another in at least one structural characteristic. The two surface structures 15a, 15b arranged axially offset from one another can be formed and matched to one another in particular so that when the rotor shaft 1 is rotated, they generate a phase-shifted quadrature signal.

The said at least one structural characteristic can be a number of elevations 16 provided along the circumferential direction U, a geometrical shaping of the elevations 16 or/and recesses 17 as well as a respective distance of elevations 16 or recesses adjacent to one another along the circumferential direction U relative to one another. In all variants, a radially measured profile height h amounts to at least ⅙ of a distance a of two elevations 16 that are adjacent in the circumferential direction U.

According to FIG. 1, the sensor device 4 can include an electrical signal line 19 for the signal transmission of sensor signals which are generated by the position/speed sensor 9 of the sensor device 4. Likewise, the sensor device 4 can include an electrical supply line 20 for supplying the position/speed sensor 9 of the sensor device 4 with electric energy. Both the signal line 19 and also the supply line 20 can be flowed through the fastening element 7 or the cooling lance 7 out of the hollow shaft interior 3 to the outside into the external surroundings 21 of the rotor shaft 1.

It is understood that the foregoing description is that of the exemplary embodiments of the disclosure and that various changes and modifications may be made thereto without departing from the spirit and scope of the disclosure as defined in the appended claims.

What is claimed is:

1. A rotor shaft for a rotor of an electric machine, the rotor shaft comprising:
    a hollow shaft extending along an axial direction that is rotatably mounted about an axis of rotation, which delimits a hollow shaft interior that can be preferentially flowed through by a coolant; and
    a sensor device arranged in the hollow shaft interior for determining a current rotary position and/or a current rotational speed of the hollow shaft,
    the sensor device includes at least one position/speed encoder and a position/speed sensor interacting with the at least one position/speed encoder for determining a relative rotary position and/or relative rotational speed between position/speed encoder and position/speed sensor,
    wherein the position/speed encoder is or includes at least one surface structure formed on the surface of the hollow shaft having a plurality of elevations and recesses alternately following one another along a circumferential direction.

2. The rotor shaft according to claim 1, wherein:
    the hollow shaft comprises an opening at least in the region of a first axial end,
    the rotor shaft includes a longitudinal fastening element formed rod-like or bolt-like, which extends through the first axial end into the hollow shaft interior, and

the sensor device is partially arranged on the fastening element and partially on the hollow shaft that is rotatable relative to the fastening element.

3. The rotor shaft according to claim 2, wherein the fastening element is formed as a cooling lance that can be flowed through by the coolant, which cooling lance communicates fluidically with the hollow shaft interior, such that coolant flowing through the cooling lance can be introduced into the hollow shaft interior.

4. The rotor shaft according to claim 1, wherein:
the position/speed encoder is firmly connected to the hollow shaft and the position/speed sensor is firmly connected to a fastening element, which is a cooling lance.

5. The rotor shaft according to claim 4, wherein:
the position/speed encoder is arranged on an inner circumferential side of the hollow shaft facing the fastening element; and
the position/speed sensor is arranged on an outer circumferential side of the fastening element or of the cooling lance facing the hollow shaft.

6. The rotor shaft according to claim 1, wherein:
the hollow shaft includes a shaft body with hollow-cylindrical geometrical shaping, which at a first axial end merges into an extension having a diameter reduced relative to the shaft body, and
the position/speed sensor is arranged or formed on the extension.

7. The rotor shaft according to claim 6, wherein the extension, is rotatably mounted on a fastening element, with a bearing device.

8. The rotor shaft according to claim 4, wherein:
the surface structure is introduced into the surface by cold extrusion or milling or casting or engraving or laser marking.

9. The rotor shaft according to claim 1, wherein the position/speed encoder includes at least two surface structures axially offset relative to one another, which differ in at least one structural characteristic from another, and
wherein the at least one structural characteristic is:

a number of elevations provided along the circumferential direction, and
a respective distance of elevations that are adjacent along the circumferential direction from one another.

10. The rotor shaft according to claim 9, wherein the two surface structures arranged axially offset to one another are designed and matched to one another so that when the rotor shaft is rotated, they generate a phase-shifted quadrature signal.

11. The rotor shaft according to claim 1, wherein the sensor device comprises at least one electrical signal line for the signal transmission of sensor signals generated by the position/speed sensor and/or at least one electrical supply line for supplying the position/speed sensor with electric energy, wherein the at least one electrical signal line and/or the at least on electrical supply line is routed via a fastening element out of the hollow shaft interior to the outside into the external surroundings of the rotor shaft.

12. A rotor for an electric machine, the rotor comprising:
a rotor shaft according to claim 1; and
magnetic field generating elements non-rotatably connected to the rotor shaft for generating a magnetic rotor field.

13. The rotor according to claim 12, wherein the magnetic field generating elements are or include rotor permanent magnets or electrically energizable rotor coils.

14. An electric machine, comprising:
a stator for generating a magnetic stator magnetic field; and
a rotor according to claim 12, whose magnetic field generating elements are magnetically coupled to the stator magnetic field for driving the rotor shaft.

15. The electric machine according to claim 14, wherein:
the machine is an externally excited electric synchronous machine or a permanent magnet-excited synchronous machine or an asynchronous machine, and
the stator is an electrically energizable synchronous machine stator for generating a magnetic stator field.

* * * * *